United States Patent
Landry et al.

(10) Patent No.: US 9,873,501 B2
(45) Date of Patent: Jan. 23, 2018

(54) SYSTEM AND METHOD FOR FABRICATING A COMPOSITE MATERIAL ASSEMBLY

(75) Inventors: Alain Landry, Quebec (CA); Germain Belanger, Quebec (CA)

(73) Assignee: LEARJET INC., Wichita, KS (US)

( * ) Notice: Subject to any disclaimer, the term of this patent is extended or adjusted under 35 U.S.C. 154(b) by 889 days.

(21) Appl. No.: 13/577,094

(22) PCT Filed: Jul. 13, 2010

(86) PCT No.: PCT/IB2010/001724
§ 371 (c)(1),
(2), (4) Date: Sep. 21, 2012

(87) PCT Pub. No.: WO2011/095834
PCT Pub. Date: Aug. 11, 2011

(65) Prior Publication Data
US 2013/0011586 A1 Jan. 10, 2013

Related U.S. Application Data

(60) Provisional application No. 61/301,754, filed on Feb. 5, 2010.

(30) Foreign Application Priority Data

Jul. 13, 2010 (WO) .................. PCT/IB2010/001724

(51) Int. Cl.
*B29C 70/30* (2006.01)
*B64C 1/06* (2006.01)
(Continued)

(52) U.S. Cl.
CPC .............. *B64C 1/068* (2013.01); *B29C 31/08* (2013.01); *B29C 31/085* (2013.01); *B29C 33/26* (2013.01);
(Continued)

(58) Field of Classification Search
CPC .............. B29C 70/30; B29C 66/12841; B29C 66/12842
(Continued)

(56) References Cited

U.S. PATENT DOCUMENTS 3,896,206 A * 7/1975 Beaver .................. B29C 70/462
264/134
4,188,358 A * 2/1980 Withoos et al. .............. 264/255
(Continued)

FOREIGN PATENT DOCUMENTS

CN 1756647 A 4/2006
CN 1796079 A 7/2006
(Continued)

OTHER PUBLICATIONS

International Search Report and Written Opinion dated Nov. 22, 2010 in corresponding International Patent Application No. PCT/IB2010/001724.
(Continued)

*Primary Examiner* — Scott W Dodds
(74) *Attorney, Agent, or Firm* — Karceski IP Law, PLLC (57) ABSTRACT

A system and method for fabricating a composite material assembly. The components of the assembly originate from more than one mold while providing curing or solidifying under heat and vacuum in one step only, preferably with a composite material in a pre-preg form which does not require autoclave treatment. A removable insert is removed from a second mold prior to assembly of a first mold to the second mold. A section of a laminate extending over the removable insert overlaps over an adjacent laminate after closing and assembly of the first mold onto the second mold.

12 Claims, 8 Drawing Sheets

(51) Int. Cl.
  *B29C 65/50* (2006.01)
  *B29C 65/00* (2006.01)
  *B29C 70/46* (2006.01)
  *B29C 70/54* (2006.01)
  *B29C 31/08* (2006.01)
  *B29C 33/26* (2006.01)
  *B29C 70/08* (2006.01)
  *B64F 5/10* (2017.01)
  *B29C 35/02* (2006.01)
  *B29L 31/30* (2006.01)
  *B64C 1/00* (2006.01)
  *B29C 65/48* (2006.01)

(52) U.S. Cl.
  CPC ........ *B29C 65/505* (2013.01); *B29C 65/5078* (2013.01); *B29C 66/1162* (2013.01); *B29C 66/12822* (2013.01); *B29C 66/12842* (2013.01); *B29C 66/543* (2013.01); *B29C 66/721* (2013.01); *B29C 66/73752* (2013.01); *B29C 70/088* (2013.01); *B29C 70/30* (2013.01); *B29C 70/462* (2013.01); *B29C 70/54* (2013.01); *B64F 5/10* (2017.01); *B29C 35/02* (2013.01); *B29C 65/483* (2013.01); *B29C 65/5071* (2013.01); *B29C 66/72525* (2013.01); *B29L 2031/3079* (2013.01); *B29L 2031/3082* (2013.01); *B64C 2001/0072* (2013.01); *Y02T 50/433* (2013.01); *Y10T 428/13* (2015.01)

(58) Field of Classification Search
  USPC ...................... 156/217, 304.1, 304.2; 428/60
  See application file for complete search history.

(56) References Cited

U.S. PATENT DOCUMENTS

| | | | | |
|---|---|---|---|---|
| 4,900,487 | A | * | 2/1990 | Lalloz et al. ................ 264/45.2 |
| 5,262,121 | A | * | 11/1993 | Goodno ....................... 264/571 |
| 5,443,784 | A | * | 8/1995 | Celerier et al. .............. 264/571 |
| 6,347,839 | B1 | | 2/2002 | Lew et al. |
| 7,325,771 | B2 | | 2/2008 | Stulc et al. |
| 7,459,048 | B2 | | 12/2008 | Pham et al. |
| 2004/0021893 | A1 | | 2/2004 | Stevens et al. |
| 2006/0251847 | A1 | | 11/2006 | Hethcock et al. |
| 2009/0148647 | A1 | | 6/2009 | Jones et al. |
| 2012/0038086 | A1 | * | 2/2012 | Pini ...................... B29C 33/485 264/313 |

FOREIGN PATENT DOCUMENTS

| | | |
|---|---|---|
| EP | 2047971 A1 | 4/2009 |
| FR | 2710871 A1 | 4/1995 |
| WO | WO 9832589 | 7/1998 |

OTHER PUBLICATIONS

Chinese Office Action dated May 6, 2014 in Chinese Patent Application No. 201080063247.8.
Canadian Office Action dated Oct. 14, 2016, for Canadian Patent Application No. 2,788,948.
Canadian Office Action dated Jul. 26, 2017, for Canadian Patent Application No. 2,788,948.

\* cited by examiner

SYSTEM AND METHOD FOR FABRICATING A COMPOSITE MATERIAL ASSEMBLY

CROSS-REFERENCE TO RELATED APPLICATION(S)

This is a National Stage Entry into the United States Patent and Trademark Office from International PCT Patent Application No. PCT/IB2010/001724, having an international filing date of 13 Jul. 2010, which claims priority to U.S. Provisional Patent Application No. 61/301,754, having a filing date of 5 Feb. 2010, the contents of both of which are incorporated herein by reference.

FIELD OF THE INVENTION

The present invention generally relates to composite materials. The present invention more specifically relates to a system and method for fabricating a composite material assembly.

BACKGROUND OF THE INVENTION

Composite material assembly, and more particularly fuselage manufacturing through the use of multi-piece sections, typically requires pre-solidification and cure of each piece prior to assemble them with splices between individual sections or portions.

The limitations of this methodology are:
a minimum two-step cure is required;
additional mechanical fasteners are required at splicing joints on primary structure components;
the methodology requires handling equipment and assembly jigs (for out-of-mold operations);
long fuselage manufacturing time;
over thickness at joints resulting in stress concentration;
increases in weight of assembly; and
surface preparation is required prior to bonding.

Various solutions for assembly of multi-piece sections have been proposed in the prior art.

U.S. Pat. No. 7,459,048 discloses a method of manufacturing a unitary section of an aircraft fuselage including steps of disposing a thin layup mandrel element onto the outer shell surface of a cylindrical inner mandrel shell to form a mandrel with a layup surface. The method further includes steps of laying-up fibers onto the layup surface while the mandrel rotates to form a unitary pre-cured section of an aircraft fuselage.

WO 98/32589 discloses composite structures having a continuous skin formed using automated fiber placement methods. The multiple layers of fibers are placed on a fiber placement tool including a mandrel body surrounded by a bladder. Uncured composite structures are created by placing fibers around the fiber placement tool as discontinuous segments that are capable of moving or sliding in relation to each other in order to be expandable from within. The uncured structures are then expanded against the other surface of the molds by creating a vacuum between the bladder and the molds.

U.S. Pat. No. 7,325,771 discloses structures and methods for joining composite fuselage sections using spliced joints attaching a first stiffener on a first composite part as well as a second stiffener on a second composite part through a fitting. A strap is then used to splice the first and second composite parts together.

US 2006/0251847 discloses a method of joining composite elements in which the bonding is done through the thickness of fiber composite laminates in order to reduce interlaminar stresses using non-interlocking and interlocking bonds.

US 2009/0148647 discloses a method of fabricating composite structures by joining a plurality of composite modules along their edges using scarf joints instead of using advance fiber placement machines that require high capital investment and operating costs.

However, there is still a need for a system and method for fabricating composite material assemblies that facilitate assembly of parts when forming structures while minimizing assembly equipment costs.

SUMMARY OF THE INVENTION

An object of the present invention is to propose a system and method that satisfies at least one of the above-mentioned needs.

According to the present invention, that object is accomplished with a system for fabricating a composite material assembly comprising:
a first mold for receiving a first module made of composite material, the first mold comprising:
a first composite material laminate support structure having first and second opposite edges; and
a first attachment interface for attachment of the first mold to an adjacent mold;
and
a second mold for receiving a second module made of composite material, the second mold comprising:
a second composite material laminate support structure having first and second opposite edges;
a second attachment interface for attachment of the second mold to the first mold; and
at least one removable insert extending beyond at least one of the first and second edges of the second mold,
wherein the first module comprises a first laminate covering the first laminate support structure, the second module comprises a second laminate covering the second laminate support structure and extending over the at least one removable insert, and wherein the at least one removable insert is removed from the second mold prior to assembly of the first mold to the second mold, and a section of the second laminate extending over the at least one removable insert overlaps over the first laminate after closing and assembly of the first mold onto the second mold.

According to the present invention, there is also provided a method for fabricating a composite material assembly comprising the steps of:
a) providing an assembly system comprising:
a first mold for receiving a first module made of composite material, the first mold comprising:
a first composite material laminate support structure having first and second opposite edges; and
a first attachment interface for attachment of the first mold to an adjacent mold;
and
a second mold for receiving a second module made of composite material, the second mold comprising:
a second composite material laminate support structure having first and second opposite edges;
a second attachment interface for attachment of the second mold to the first mold; and
at least one removable insert extending beyond at least one of the first and second edges of the second mold;

b) laying down the first module on the first mold, the first module comprising a first laminate covering the first laminate support structure;

c) laying down the second module on the second mold, the second module comprising a second laminate covering the second laminate support structure and extending over the at least one removable insert;

d) removing the at least one removable insert from the second mold; and e) assembling the first mold to the second mold while overlapping a section of the second laminate extending over the at least one removable insert over the first laminate.

The present invention provides means for manufacturing one-piece composite components originating from more than one mold while providing a structure that can be cured or solidified under heat and vacuum in one step only, preferably with a composite material in a pre-preg form which does not require autoclave treatment.

A non-restrictive description of a preferred embodiment of the invention will now be given with reference to the appended drawings.

PREFERRED EMBODIMENTS OF THE PRESENT INVENTION

An object of the present invention is to manufacture a composite material assembly, such as, but not limited to, a tubular profile structure from two or more longitudinal section components. The whole assembly can be cured in one step in order to form a one-piece tubular structure, such as, for example, a fuselage. Hence, the components that will constitute the whole assembly are joined before curing occurs and then the whole assembly is cured through co-curing of these components, producing an end product without any overly apparent seams.

Figure 1A:
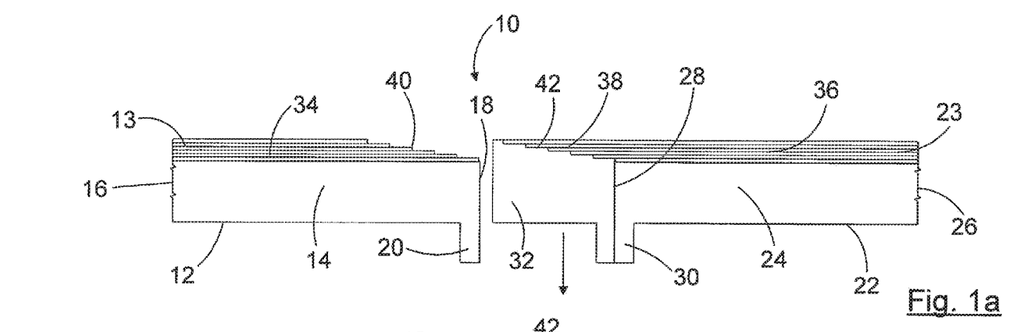
FIGS. 1a to 1c are side cross-sectional views of the system according to a preferred embodiment of the present invention, showing an assembly sequence of a first monolithic laminate on a first mold onto a second monolithic laminate of a second mold with prior removal of a removable insert.
Figure 1B:
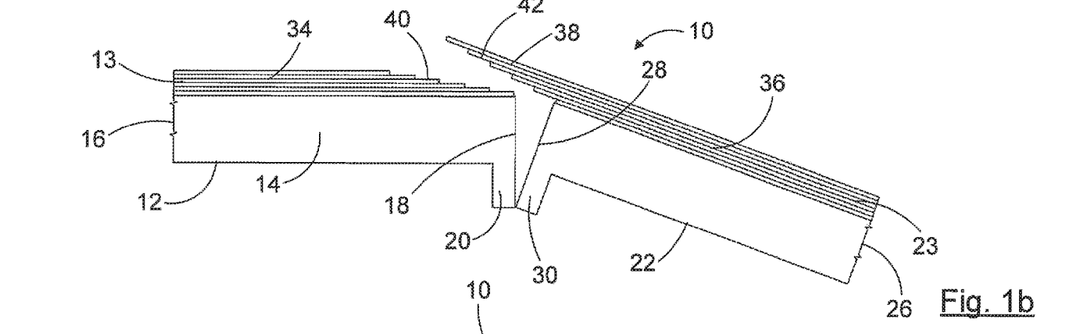
Figure 1C:
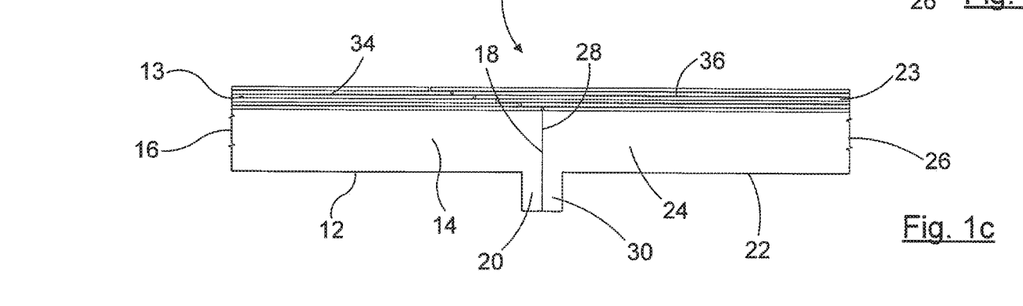

Referring to FIGS. 1a to 1c, according to a first preferred embodiment of the present invention, a system 10 for fabricating a composite material assembly is disclosed. The system 10 includes a first mold 12 for receiving a first module 13 made of composite material. The first mold 12 has a first composite material laminate support structure 14 having first and second opposite edges 16, 18. The first mold 12 also has a first attachment interface 20 for attachment of the first mold 12 to an adjacent mold 22. The system 10 also comprises a second mold 22 for receiving a second module 23 made of composite material. The second mold 22 includes a second composite material laminate support structure 24 having first and second opposite edges 26, 28. The second mold 22 also has a second attachment interface 30 for attachment of the second mold 22 to the first mold 12.

The system 10 further comprises a removable insert 32 extending beyond the second edge 28 of the second mold 22. The insert 32 is shaped such that it would contact the first mold 12 if the first and second molds 12, 22 were attached together and would prevent attachment therebetween if the insert 32 was present.

The first module 13 comprises a first laminate 34 covering the first laminate support structure 14. The second module 23 comprises a second laminate 36 covering the second laminate support structure 24 and extending over the removable insert 32. As better shown in the transition between FIG. 1a and FIG. 1b, the removable insert 32 is removed from the second mold 22 prior to assembly of the first mold 12 to the second mold 22. As better shown in FIG. 1b, a section 38 of the second laminate 36 extending over the removable insert 32 overlaps over the first laminate 34 after closing and assembly of the first mold 12 onto the second mold 22. At the initial closing of the molds 12, 22, the laminates 34, 36 are not cured or solidified, allowing the required tackiness, softness and flexibility to ensure proper intermesh and layup at the interface.

Preferably, the first laminate 34 has a first interface profile 40 shaped to fit into a complementary second interface profile 42 of the section of the second laminate 36 extending over the removable insert 32. The second laminate 36 can therefore overlap over the first laminate 34, and form a joint without an overly apparent seam, between the first and second modules 13, 23. Preferably, the interface profiles 40, 42 are chosen to form a stepped-lap joint. During initial placement of the laminates 34, 36 on the molds 12, 22, the removable insert 32 provides the extension surface that is required to form the stepped-lap joint.

Figure 8A:
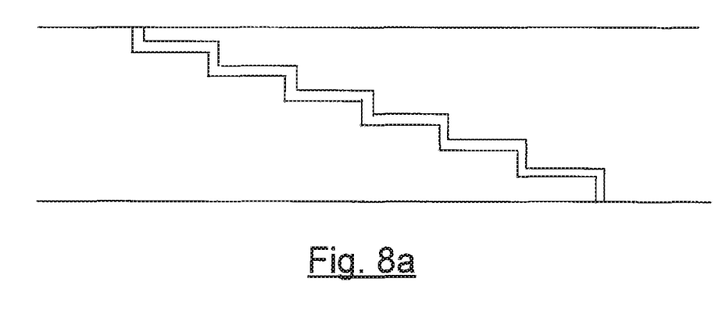
FIGS. 8a and 8b are schematic views of a stepped-lap joint interface and a scarf-joint interface respectively
Figure 8B:
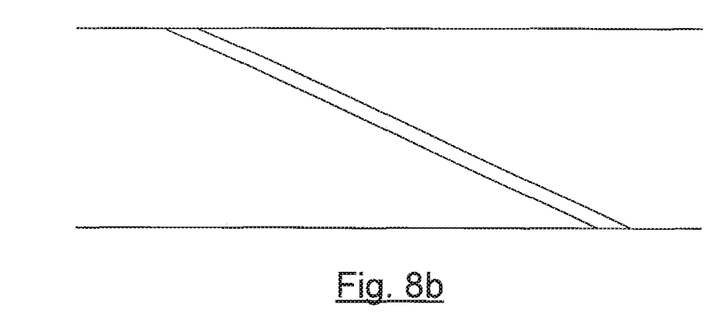

Preferably, when the composite material assembly is a tubular component, the final assembly results from two or more joints. Given that the chosen type of joint for this application must minimize any over thickness in order to obtain a uniform structure thickness along the perimeter of circumference of the assembly, it is preferable to use a type of joint that requires superimposing two half-elements, preferably through a stepped-lap interface as mentioned above. In other embodiments of the present invention for fuselage applications, the stepped-lap interface, as shown in FIG. 8A, at the sectional interface between modules could be changed for a scarf-type lamination, as shown in FIG. 8B without affecting the required constant thickness of the fuselage structure.

As shown in FIG. 1b, manufacturing of a joint in accordance with the present invention requires that one section 38 of the laminate 36 overhangs temporarily and is therefore not supported beyond the edge 38 of the mold 32. This overhanging configuration is required for the period of time between removal of the insert 32 and closing of the molds 12, 22 for forming the assembly.

In order to allow closing of the molds 12, 22, each of the half-elements of the complementary interface profiles 40, 42 to be stacked must avoid contact with each other during the closing movement of the molds 12, 22, as there can be a risk of localized pre-adherence, before the two half-elements are positioned correctly. Any incorrect positioning of the two sides of the interface for the laminate could result in the formation of air pockets and result in an abnormal discontinuity in the structural laminate in the joint assembly zone.

In order to avoid this possibility of pre-adherence between the two half-elements of the joint prior to the final closed position of the molds 12, 22, the removable insert 32 preferably has a geometrical form shaped to position the overhanging section 38 of the laminate 36, with the interface profile 42, above its corresponding interface profile 40 on the other mold 12 without incurring any contact or pre-adherence, after the insert 32 is removed.

Preferably, the surface of the insert 32 on which the overhanging section 38 of the laminated interface is resting has an angular position of at least 10° and preferably between 10° and 15° with respect to a tangential direction of the second laminate 36 of the second mold 22, at the edge 28 of the second mold 22 where the removable insert 32 is positioned, towards an inner side of the second mold 22.

Figures 2A, 2B:
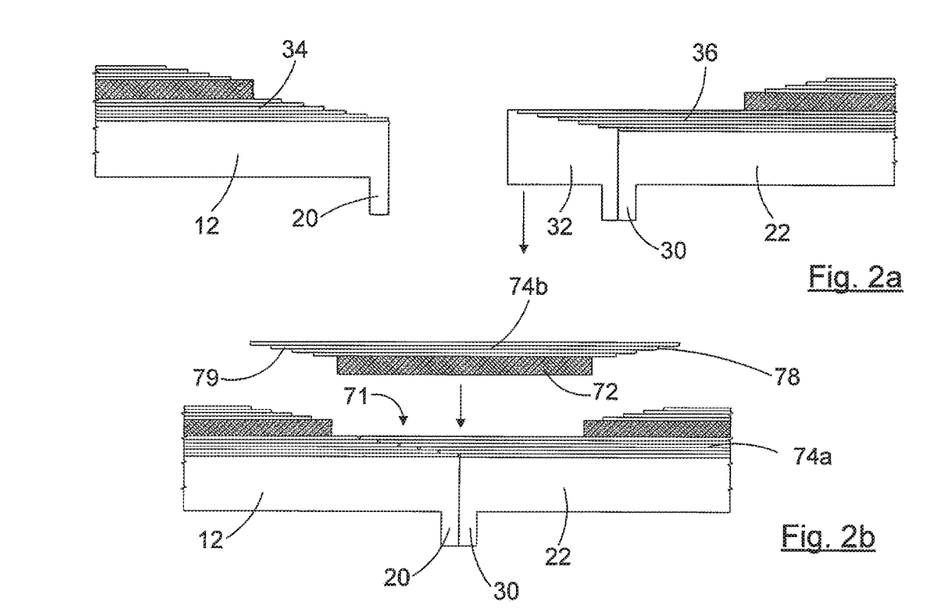
FIGS. 2a to 2c are side cross-sectional views of the system according to another preferred embodiment of the present invention, showing an assembly sequence of a first sandwich laminate on a first mold onto a second sandwich laminate of a second mold with prior removal of a removable insert, and a subsequent addition of a layup splice.
Figure 2C:
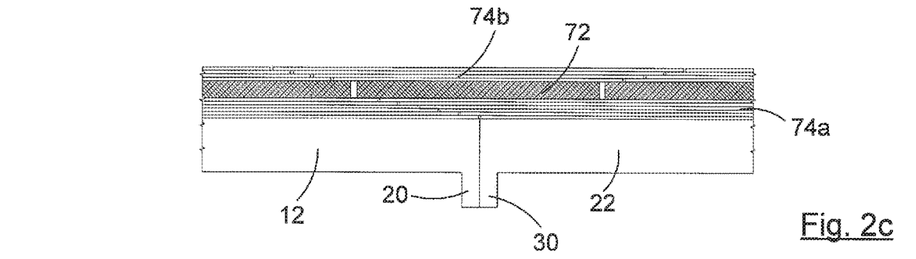

For fuselage applications, the required laminate construction for the fuselage can be a monolithic configuration, as shown in FIGS. 1a to 1c, or sandwich/core structure, as shown in FIGS. 2a to 2c, or a combination of the two. Preferably, in the case of a fuselage sandwich/core structure, as shown in FIGS. 2a to 2c, the initial laminated assembly produced with the removable insert 32 and the molds 12, 22 is the same but this laminated assembly may now be designated as an "outer skin" 74a. As shown in FIG. 2b, the "outer skin" 74a receives a sandwich honeycomb core 72 followed by an "inner skin" 74b which could be of different construction. The inner skin laminate 74b is terminated also at its longitudinal edges 78, 79 by a stepped-lap geometry being in full contact with the sandwich core 72 surface. Preferably, the laminates are made of "out of autoclave" carbon—epoxy pre-preg and the sandwich/core structure comprises a Nomex™ honeycomb core, however, other materials may be used.

Preferably, the removable insert 32 is a structural element. However, the removable insert may be an inflatable structure, or any other retractable molding structure known to a person skilled in the art.

Preferably, the attachment interfaces 20, 30 are hinge-type interfaces. However, other types of attachment interfaces may be used. Moreover, the attachment interfaces 20, 30 may comprise a cam assembly in order to provide a sufficient amount of clearance for the overhanging section 38 of the laminate 36 to avoid inadvertent contact and pre-adherence with the other side of the interface.

Preferably, the system 10 further comprises a flexible elastomeric seal at a joint interface between the first and second molds 12, 22. The flexible elastomeric seal provides vacuum integrity of the mold assembly needed for the curing procedure.

Preferably, a release agent is applied to the first and second molds 12, 22 prior to laying down of the first and second modules 13, 23 thereon. The release agent is preferably one of three types: (i) liquid or paste, (ii) in the form of a plastic film and (iii) of a permanent type such as a Teflon™ coating and one skilled in the art can select the appropriate one for its particular need. Additionally, other types of release agents may be considered. The release agent is applied in each mold to allow remolding of other modules after a curing step.

Preferably, the first and second molds 12, 22 are portions of a cylindrical structure. The system can therefore be used to form a curved assembly as shown in FIGS. 3a to 3e and FIGS. 4a to 4e. Preferably, the molds have a geometric shape adapted to form a tubular-profiled structure and comprises at least two 180° sections or preferably three 120° sections.

Figure 3A:
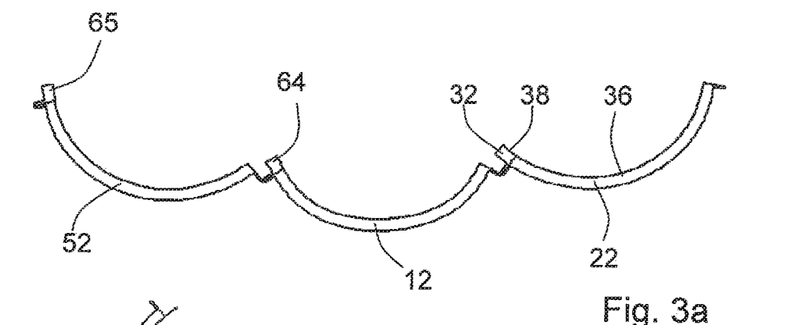
FIGS. 3a to 3e are front views of a build sequence of a tubular component using the system according to another preferred embodiment of the present invention, using one removable insert per mold.
Figure 3B:
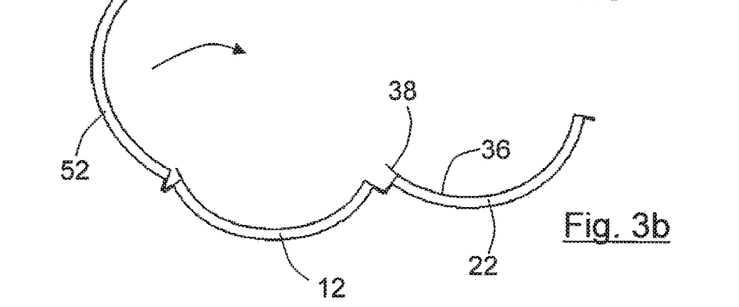
Figure 3C:
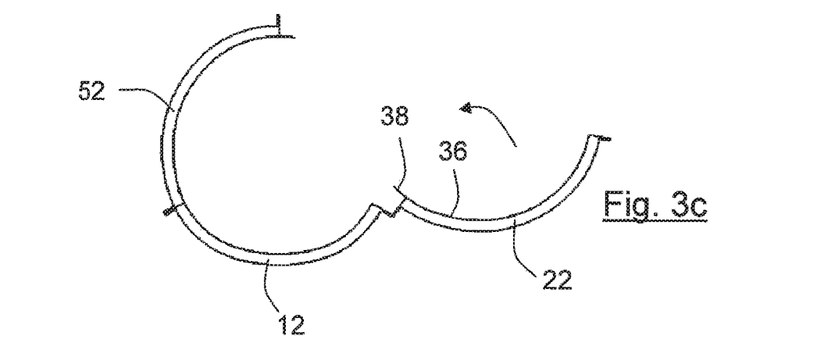
Figure 3D:
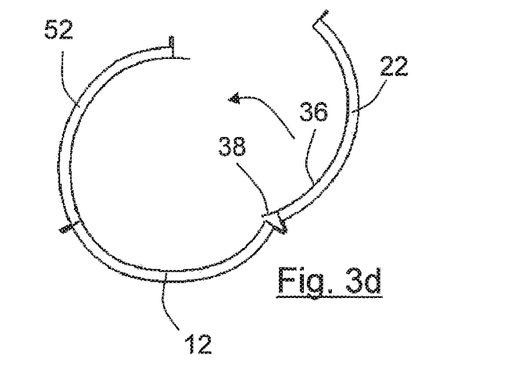
Figure 3E:
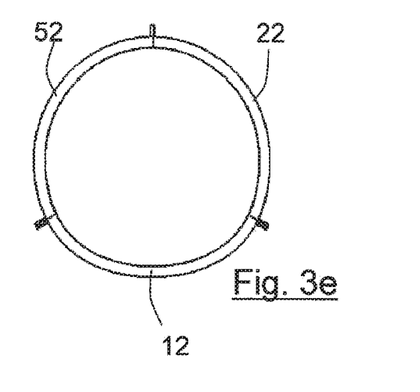
Figure 4A:
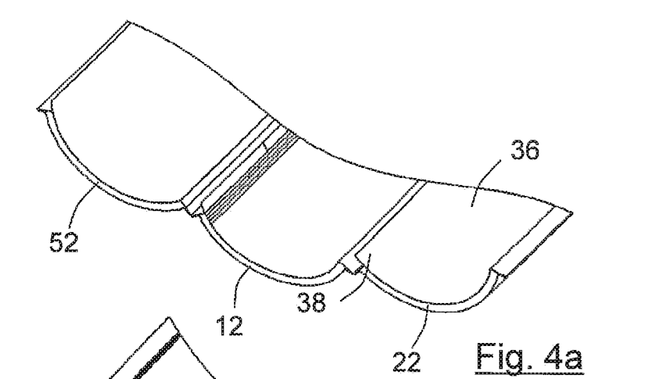
FIGS. 4a to 4e are perspective views of the build sequence of the tubular component shown in FIGS. 3a to 3e.
Figure 4B:
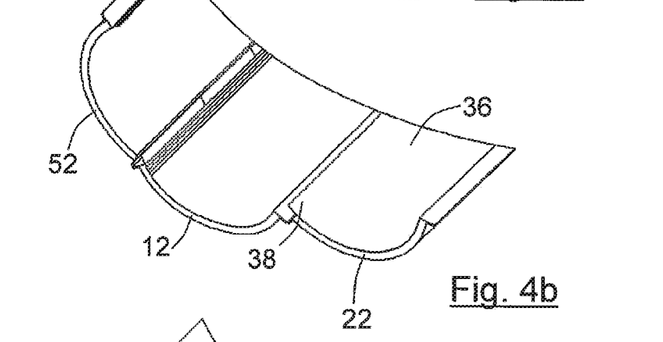
Figure 4C:
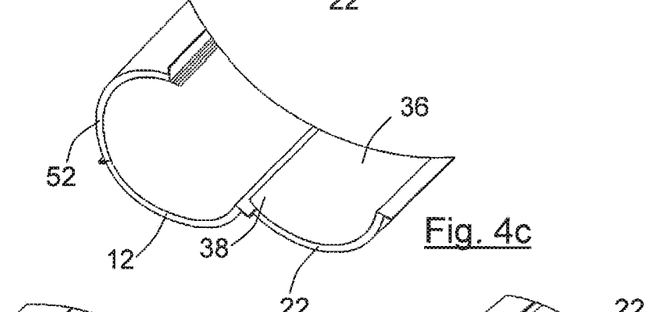
Figure 4D:
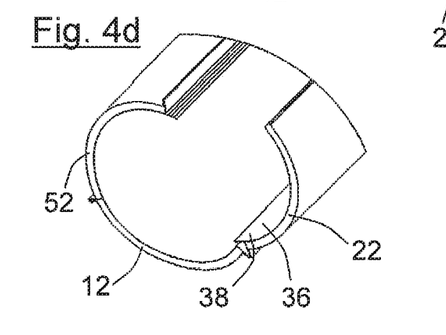
Figure 4E:
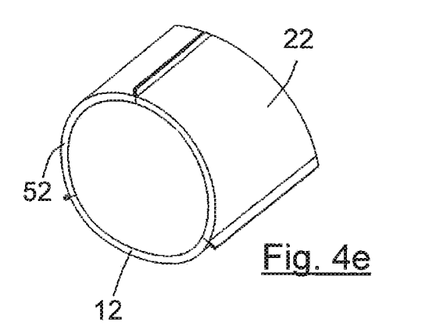

Referring to FIG. 3a, when the molds are made of three sections, a central mold 12 rests on the ground with the two other molds 22, 52 placed adjacently.

Figure 5A:
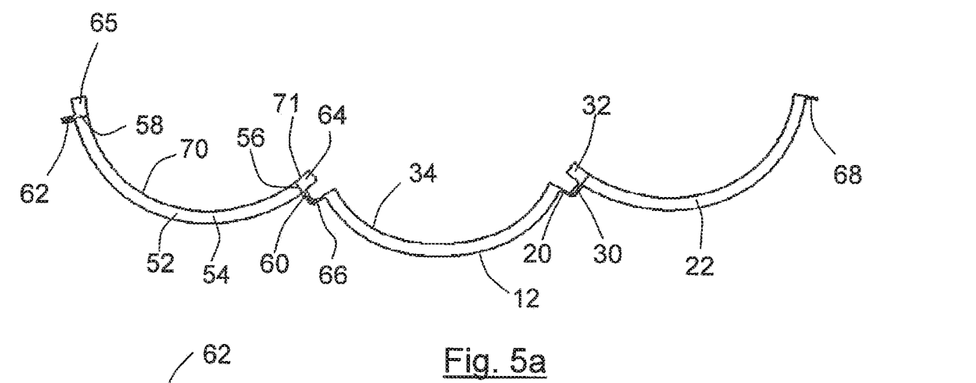
FIGS. 5a to 5c are front views of initial steps of a build sequence of a tubular component using the system according to another preferred embodiment of the present invention, with an alternate distribution of removable inserts with respect to the molds, with no insert on a first mold, one (1) insert on a second mold and two (2) inserts on a third mold.
Figure 5B:
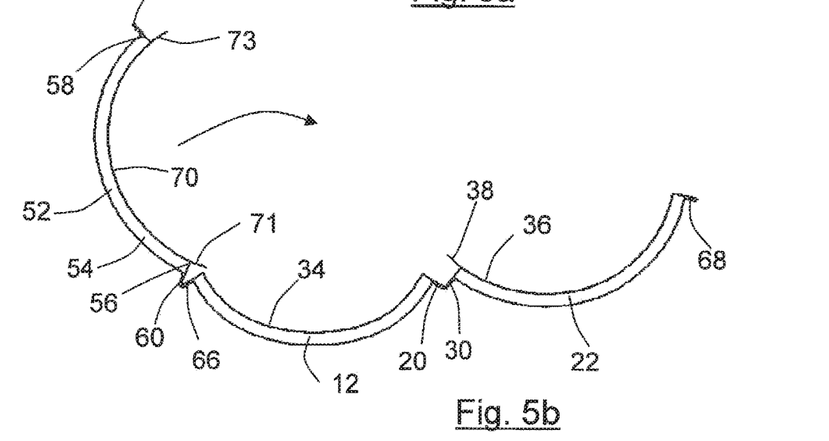
Figure 5C:
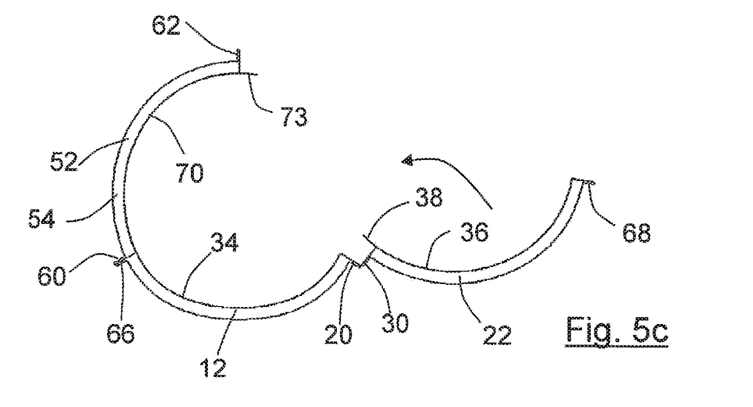
Figure 6A:
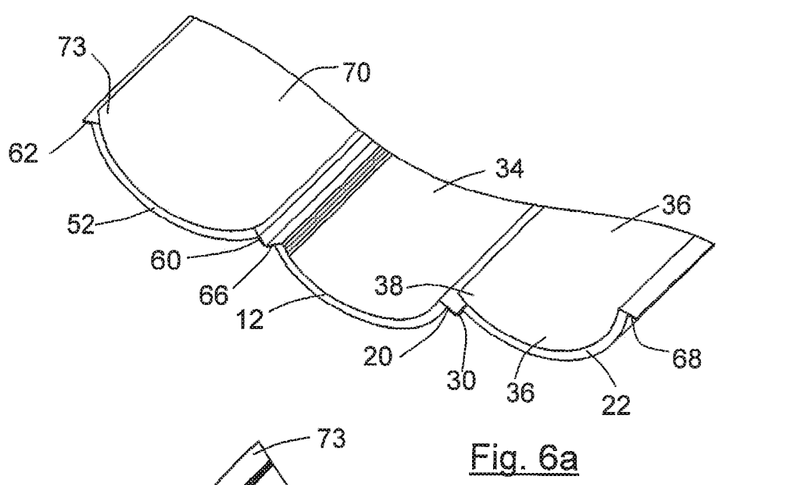
FIGS. 6a to 6c are perspective views of the build sequence of the tubular component shown in FIGS. 5a to 5c.
Figure 6B:
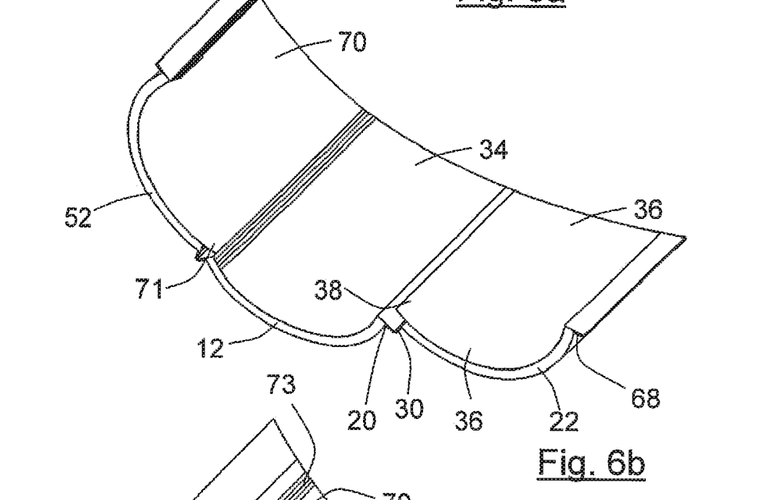
Figure 6C:
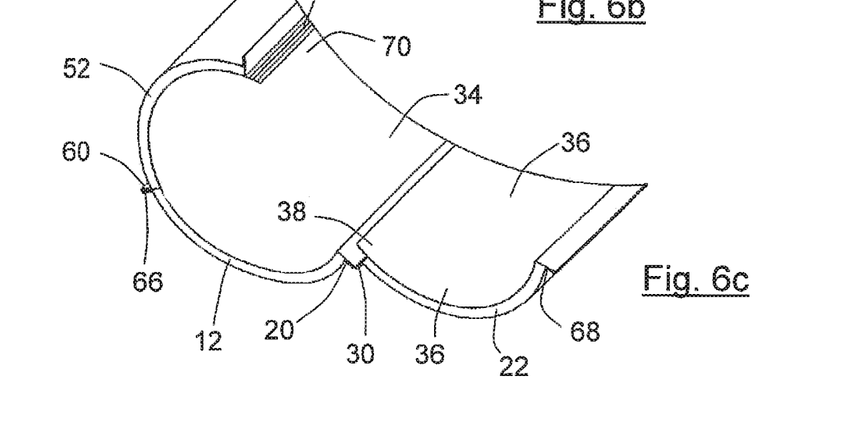

Preferably, when the assembly molds 12, 22, 52 comprise three sections to form a cylindrical structure, the removable inserts can be positioned in different manners. In a preferred embodiment of the present invention, one insert is associated with each mold 12, 22, 52, as shown in FIGS. 3a to 3e, since such a configuration allows for the manufacture of three (3) identical molds/inserts. However, other configurations can be considered. For example, no insert can be associated with the first mold 12, one insert can be associated with the second mold 22, and two inserts can be associated with the third mold 52, as shown in FIGS. 5a to 5c.

The closing sequence of the different molds 12, 22, 52 is not influenced by the positioning and distribution of the inserts among the different molds because a clearance zone has been designed into the shape of the molds in order to position, within this clearance zone, the overhanging section 38 of the laminate 36 to avoid contact between the two sides of the interface of the assembled laminate interface during closing of the molds.

Preferably, for assembly of cylindrical fuselage components, among other applications, three molds 12, 22, 52 are provided. As better shown in FIGS. 5a to 5c, the system 10 for fabricating a composite material assembly comprises a third mold 52 for receiving a third module made of composite material. The third mold 52 includes a third composite material laminate support structure 54 having first and second opposite edges 56, 58. The third mold also has a pair of opposite third and fourth attachment interfaces 60, 62 for attachment of the third mold 52 to the first and second molds 12, 22. The third mold 52 also has second and third removable inserts 64, 65 extending beyond the first and second edges 56, 58 of the third composite material laminate support structure 54. The first mold 12 comprises a fifth attachment interface 66 for attachment of the first mold 12 to the third mold 52. The second mold 22 comprises a sixth attachment interface 68 for attachment of the second mold 22 to the third mold 52. A third laminate 70 covers the third layup structure 54 and extends over the second and third removable inserts 64, 65. The first, second and third removable inserts 32, 64, 65 are removed from the second and third molds 22, 52 prior to assembly of the first, second and third molds 12, 22, 52. A section 71 of the third laminate extending over the second removable insert 64 overlaps over the first laminate 34 after closing and assembly of the third mold 52 onto the first mold 12. Another section 73 of the third laminate extending over the third removable insert 65 overlaps over the second laminate 36 after closing and assembly of the third mold 52 onto the second mold 22. As mentioned above, the distribution of the inserts 32, 64, 65 among the different molds as shown in FIGS. 5a to 5e may vary for a selected assembly closure sequence and correspond, for example, to the distribution of inserts 32, 64, 65 shown in FIGS. 3a to 3e. In FIGS. 5a to 5e, the distribution of the inserts is such that first mold 12 resting on the ground has no inserts and sections 71, 38 overlap over the first laminate which may be a more practical sequence of assembly of the laminates in certain assembly configurations.

According to the present invention, there is also provided a method for fabricating a composite material assembly comprising the steps of:

a) providing an assembly system 10, as shown in FIGS. 1a to 1c comprising:
   a first mold 12 for receiving a first module 13 made of composite material, the first mold 12 comprising:
     a first composite material laminate support structure 14 having first and second opposite edges 16, 18; and
     a first attachment interface 20 for attachment of the first mold 12 to an adjacent mold 22; and
   a second mold 22 for receiving a second module 23 made of composite material, the second mold 22 comprising:
     a second composite material laminate support structure 24 having first and second opposite edges 26, 28;
     a second attachment interface 30 for attachment of the second mold 22 to the first mold 12; and
     at least one removable insert 32 extending beyond the edge 28;

b) laying down the first module 13 on the first mold 12, the first module 13 comprising a first laminate 34 covering the first laminate support structure 14;

c) laying down the second module 23 on the second mold 22, the second module 23 comprising a second laminate 36 covering the second laminate support structure 24 and extending over the removable insert 32;

d) removing the removable insert 32 from the second mold 22;

e) assembling the first mold 12 with the second mold 22 while overlapping a section 38 of the second laminate 36 extending over the removable insert 32 over the first laminate 34.

Preferably, the method further comprises the step of f) curing the assembled first and second modules 13, 23 in an oven. When the method according to the present invention is used to manufacture a fuselage assembly, considering the fact that the entire composite structure of the fuselage has been realized in a complete uncured state and that the composite structure is fully assembled in a tubular profile, the entire fuselage assembly inside the closed mold has to be solidified by putting it under vacuum and heat inside a curing oven. Under only one "heat and pressure cycle" the pre-preg laminate and adhesive will cure and solidify to generate a one-piece tubular section of fuselage without an overly apparent seam. It is however understood by one skilled in the art that any appropriate curing process is possible pursuant to the invention.

Preferably, the one-piece section of fuselage produced using the system or method may integrate or comprise floor attachment members, a cockpit windshield, cabin windows and passenger door surrounding structures. All of these features may be all cured in one step only. The system and method according to the present invention can be used for any portion of a flying vehicle which possesses a tubular profile with a need to be co-cured for reducing any overly apparent seam, such as any cabin of an aircraft.

Figure 7:
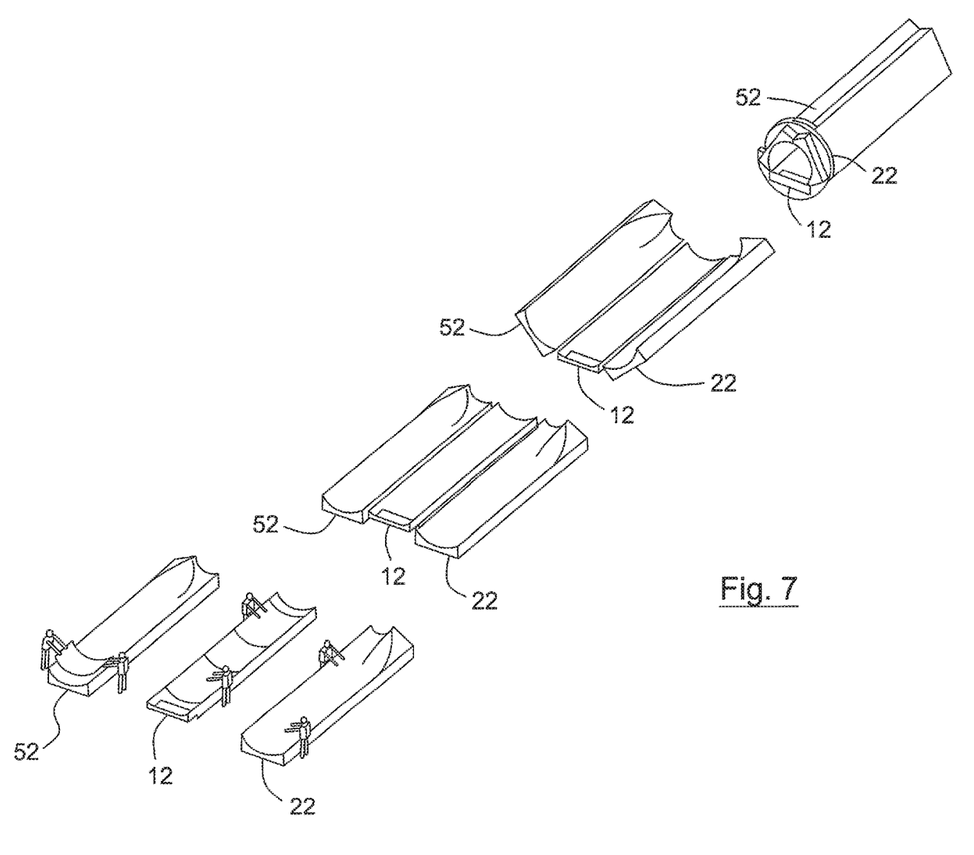
FIG. 7 is a perspective view of a build sequence of a fuselage component using the system according to another preferred embodiment of the present invention and showing installation of composite layup materials by personnel.

Referring to FIG. 7, the system and method according to the present invention can be used for manufacturing of one-piece fuselage sections and facilitate the layup of composite pre-preg material on the molds 12, 22, 52 in an almost horizontal position, thus reducing the counter effect of gravity when compared to a tubular or cylindrical molds.

Although preferred embodiments of the present invention have been described in detail herein and illustrated in the accompanying drawings, it is to be understood that the invention is not limited to these precise embodiments and that various changes and modifications may be effected therein without departing from the scope or spirit of the present invention.

The invention claimed is:

1. A system for fabricating a composite material assembly comprising:
   a first mold having a first structure for receiving a first module made of composite material, said first mold comprising:
     a first composite material laminate support structure comprising a first laminate support surface and first and second opposite edges; and
     a first attachment interface for attachment of the first mold to an adjacent mold; and
   a second mold for receiving a second module made of composite material, said second mold comprising:
     a second composite material laminate support structure comprising a second laminate support surface and third and fourth opposite edges; and
     a second attachment interface for attachment of the second mold to the first mold; and
   at least one removable insert, having a second structure different from the first structure, extending beyond the third edge of the second mold, the at least one removable insert extending the second laminate support surface past the third edge of the second mold, the second structure of the at least one removable insert comprising a laminate overhang support surface, said overhang support surface having a shape to support a section of an overhanging laminate of the second module, said shape of the overhang support surface having a shape of a first interface profile of a first laminate supportable on the first mold, said shape of the overhang support surface being complementary to a second interface profile of a second laminate supportable on the second mold, said shape of the overhang support surface being selected from a group comprising a form of a laminate stepped-lap joint and a form of a laminate scarf joint,
   wherein the at least one removable insert is removable from the third edge of the second mold prior to assembly of the first mold to the second mold, such that a laminate previously extending over the at least one removable insert overlaps a laminate on the first laminate support surface of the first mold.

2. The system according to claim 1, wherein the first and second molds are portions of a cylindrical structure.

3. The system according to claim 1, wherein said laminate overhang support surface being oriented at an offset angle of at least 10° with respect to a tangential direction of the second laminate support surface of the second mold, at the third edge of the second mold where the at least one removable insert is positioned, towards an inner side of the second mold.

4. The system according to claim 3, wherein the offset angle is between 10° and 15°.

5. The system according to claim 1, further comprising a flexible elastomeric seal at a joint interface between the first and second molds.

6. The system according to claim 1, wherein a release agent is applied to the first and second molds prior to laying down of the first and second modules thereon.

7. The system according to claim 1, wherein the first and second modules are in an uncured state during assembly.

8. The system according to claim 1, further comprising:
a third mold for receiving a third module made of composite material, said third mold comprising:
a third composite material laminate support structure comprising a third laminate support surface and fifth and sixth opposite edges;
a pair of opposite third and fourth attachment interfaces for attachment of the third mold to the first and second molds; and
second and third removable inserts extending respectively beyond the fifth and sixth edges of the third mold, the second and third removable inserts extending the third laminate support surface,
wherein the first mold comprises a fifth attachment interface for attachment of the first mold to the third mold, the second mold comprises a sixth attachment interface for attachment of the second mold to the third mold, and wherein the second and third removable inserts are removable from the third mold prior to assembly of the first, second and third molds, such that a laminate previously extending over the second removable insert overlaps a laminate on the first laminate support surface and a laminate previously extending over the third removable insert overlaps a laminate on the second laminate support surface, and wherein the first, second and third molds form a closed cylindrical structure.

9. The system according to claim 8, wherein the laminates are outer mold line skins.

10. The system according to claim 9, further comprising an inner mold line skin placed over the outer mold line skins and a core interposed between the inner and outer mold line skins.

11. A system for fabricating a composite material assembly comprising:
a first mold having a first structure comprising:
a first laminate support structure comprising a first laminate supporting surface;
a second mold comprising:
a second laminate support structure comprising a second laminate support surface and first and second opposite edges;
an attachment interface for attachment of the second mold to the first mold; and
at least one removable insert, having a second structure different from the first structure, extending beyond the first edge of the second mold, the at least one removable insert extending the second laminate support surface past the first edge of the second mold, the second structure of the at least one removable insert comprising a laminate overhang support surface, said overhang support surface having a shape to support a section of an overhanging laminate, said shape of the overhang support surface having a shape of a first interface profile of a first laminate supportable on the first mold, said shape of the overhang support surface being complementary to a second interface profile of a second laminate supportable on the second mold, said shape of the overhang support surface being selected from a group comprising a form of a laminate stepped-lap joint and a form of a laminate scarf joint,
wherein the at least one removable insert is removable from the first edge of the second mold prior to assembly of the first mold to the second mold, such that a laminate previously extending over the at least one removable insert overlaps a laminate on the first laminate supporting surface of the first mold.

12. The system according to claim 11, wherein said laminate overhang support surface being oriented at an offset angle of at least 10° with respect to a tangential direction of the second laminate support surface of the second mold at the first edge of the second mold where the at least one removable insert is positioned.

* * * * *